United States Patent [19]

Lazzari

[11] Patent Number: 4,510,544
[45] Date of Patent: Apr. 9, 1985

[54] OPTOELECTRONIC DEVICE FOR READING DATA CONTAINED ON A MAGNETIC MEDIUM

[75] Inventor: Jean-Pierre Lazzari, Montfort l'Amaury, France

[73] Assignee: Compagnie Internationale pour l'Informatique CII-Honeywell Bull, Paris, France

[21] Appl. No.: 417,904

[22] Filed: Sep. 14, 1982

[30] Foreign Application Priority Data

Oct. 16, 1981 [FR] France ............................... 81 19543

[51] Int. Cl.³ .............................................. G11B 5/32
[52] U.S. Cl. ..................................... 360/114; 360/137
[58] Field of Search ................ 360/114, 137; 369/110, 369/46; 365/122

[56] References Cited

U.S. PATENT DOCUMENTS

4,410,277 10/1983 Yamamoto et al. ............ 360/114 X

Primary Examiner—John H. Wolff
Attorney, Agent, or Firm—Kerkam, Stowell, Kondracki & Clarke

[57] ABSTRACT

An optoelectronic device for reading data contained on the magnetic surface of a carrier comprises a source ($SLP_i$) for emitting a beam of polarized light and means ($MDK_i$) for detecting the angle of rotation of the polarization plane of the light. An optical focusing lens is provided for focusing onto a large observation field to enable simultaneous viewing of a plurality of tracks and a plurality of data on each track. Projection lenses ($MPROJ_i$) enable projection of the image of the surface viewed by the optical means onto a plane P where optoelectronic transducers ($TRPE_{ij}$) have been set up. The transducers may be arranged in a matrix or along a straight line.

7 Claims, 15 Drawing Figures

OPTOELECTRONIC DEVICE FOR READING DATA CONTAINED ON A MAGNETIC MEDIUM

BACKGROUND OF THE INVENTION

1. Field of the Invention

The present invention relates to an optoelectronic device for reading data contained on a magnetic medium. It especially applies to magneto-optical memories chiefly used in data processing system.

2. Description of the Prior Art

It is known that data processing systems basically contain a central processing unit and a plurality of input/output devices, also called "peripheral units". These systems are used to enter information into the central processing unit (CPU) where arithmetic logic units process the information. After processing is completed, the CPU sends the information to the output devices. The result of the operations performed by the CPU is then used and analyzed immediately by the user of the information-processing system or else is stored for variable periods of time into memories, most often called "mass storage".

The two most frequently used forms of mass storage are magnetic disc memories and tape drives.

In magnetic disc memories, the information is contained on magnetic discs within circular, concentric recording tracks whose radial width is on the order of several tens of microns. These tracks usually cover the major portion of the two surfaces of the disc.

In magnetic tape drives, the information is stored on magnetic tape within tracks which are parallel to the length of the tape.

Generally, a series of magnetic bits of information recorded on a track of a magnetic disc or tape appears in the form of a succession of small magnetic domains, called "elementary domains", which are distributed over the entire length of the track and have magnetic inductions of equal magnitude and opposite direction.

The means which allow data to be recorded on discs or tapes, or to be read, or both of these functions to be performed, are called transduction devices or, more simply, transducers. Generally, a given storage device (disc or tape) has one or more associated transducers, with the storage device moving past such transducer(s).

There are two major types of magnetic disc memories. These are disc-type memories and magneto-optical memories.

Disc-type memories will be designated as "conventional disc memories". The reading and writing functions are performed by magnetic transducers generally consisting of a magnetic circuit surrounded by windings and which includes a magnetic core. Variations in the induction within the core of such a transducer allow the reading and/or recording of the data contained in the storage device associated with this transducer.

The longitudinal density (or line density) is defined as the number of bits of information per unit of length measured in relation to the circumference of a track, in the case of a magnetic disc, or in relation to the length of the tape, in the case of a magnetic tape.

The radial density (in the case of a magnetic disc) is the number of tracks per unit of length measured in relation to the diameter of the disc.

The term "bit" is used to designate both the binary information unit which is equal to 1 or to 0, and any physical representation of this information which, for example, could be an elementary magnetic domain contained on a track of magnetic disc or also an analog or logic electrical signal.

Current conventional disc memories achieve radial densities on the order of 350 to 450 tracks per centimeter (i.e., 850 to 1,000 tracks per inch expressed as 850 to 1,000 TPI), whereas longitudinal densities are on the order of 2,000 bits per centimeter, corresponding to about 5,000 bits per inch,(expressed as 5,000 bpi). Magneto-optical memories have the writing function performed for the most part by magnetic means, whereas the reading function is performed by an optoelectronic apparatus which includes a set of optical devices and photoelectric transducers which transform the light they receive into an electrical signal. In other words, magneto-optical memories are memories in which data is stored on magnetic discs and read by optoelectronic devices. The radial and longitudinal densities obtained are on the order of 25,000 TPI and 25,000 bpi, respectively. Thus, the size of the elementary magnetic domains is on the order of 1 to 2 microns, and the width of the tracks is of the same magnitude.

Magneto-optical memories use two major modes of writing data, namely, a "thermo-magnetic" writing mode and a purely magnetic writing mode using magnetic transducers which may be of the type described above. The principle of the thermomagnetic mode of writing is to use the termal effect of the impact of an electromagnetic laser beam on the magnetic material forming the recording surface of the magnetic discs. The laser beam is made of coherent mono-chromatic electromagnetic radiation.

Electromagnetic radiation (which can be called light in a general sense) is linearly polarized in the plane when the electric-field vector (and, subsequently, the magnetic induction vector) continuously maintains the same direction in the plane which is perpendicular to the direction of propagation of the wave. This is true for any position of this plane in space, at any instant of observation. The polarization plane is defined as the plane which contains the direction of propagation of light and the electric-field vector.

Electromagnetic radiation is said to be coherent when, for example, in the case of linearly polarized light in the plane, the phase of the electric field and, thereby, the phase of the magnetic induction field, are identical at all points of another identical plane which is perpendicular to the direction of propagation.

To write a bit on a magnetic disc, using the thermomagnetic mode of writing, requires that a focused laser beam be generated, the size of that beam being of the same magnitude as the bit to be written, i.e., one or two microns. It is assumed that initially the magnetization of the magnetic film constituting the magnetic discs is uniform, i.e., the magnetic induction at every point has the same direction and the same magnitude. At the spot where the laser beam strikes the surface of the magnetic disc, this surface is heated to the point where the temperature of the magnetic film at that spot becomes much higher than the Curie $T_c$ temperature of the magnetic material, which is the temperature at which the magnetic material begins to lose its magnetization. If that spot is then subjected to a magnetic field in the direction opposite to that of the magnetization in the magnetic film, the magnetic material, upon cooling (the laser beam having then been turned off), will then become magnetized in the direction opposite to that of the uniform magnetization of the rest of the magnetic film on the magnetic disc.

The data reading mode (in magneto-optical memories) is based on the principle of interaction between polarized light and the magnetic state of the film which constitutes the magnetic disc, and that interaction produces a rotation of the electric-field vector in the plane which is perpendicular to the direction of propagation (and also of the magnetic field of the electromagnetic radiation which constitutes polarized light). For this purpose, a beam of linearly polarized light, preferably monochromatic, is emitted (such polarized light may be, for instance, a laser beam), and this beam is focussed so that its size is on the order of the magnetic domain constituting data contained on the magnetic disc. If the magnetic medium is assumed to be such that its magnetization is perpendicular to the surface of the film, which is called "perpendicular magnetization" (a longitudinally magnetized magnetic medium could also be used, i.e., where the magnetization would be parallel to the film itself), it is observed that after the incident beam has been reflected by this film, the electric-rield vector of the polarized light is rotated in the plane which is perpendicular to the direction of propagation of the light, which by convention is said to be equal to angle ($-o$) when the beam of light strikes a domain having negative magnetization and equal to ($+o$) when the beam of light strikes a domain having positive magnetization. The physical phenomenon which has just been described (the interaction between light and the magnetic state of the material producing a rotation of the field vector and of the electric-rield vector) is called the "Kerr effect". (The Kerr effect is said to be polar f the magnetization of the magnetic field is perpendicular, and to be longitudinal if the magnetization of the film is long:tudinal).

It can be seen that in order to determine the value of a bit, all that is needed is to detect the rotation of the electric field vector. This is accomplished by means of a device called an analyzer, which consists of a crystal favoring one direction of propagation of light, which is positioned in such way that this direction is 90° away from the direction of the electric-field vector of reflected light if that light has been reflected by a magnetic domain having negative magnetization. Under these conditions, a light of zero intensity is collected at the output of the analyzer. On the other hand, when that light is reflected on a magnetic domain having positive magnetization, a light of positive intensity appears at the output of the analyzer. Put differently, the domains having negative magnetization will appear as black spots on a screen placed at the output of the analyzer, while domains having positive magnetization will appear as light spots.

It is obvious that if photoelectric transducers (e.g., silicon photodiodes) are placed at the output of the analyzer, the signal produced by the photoelectric transducer will have zero voltage (or zero current) in the presence of a domain having negative magnetization, and a non-zero voltage in the presence of a domain having positive magnetization.

Opto-electronic magnetic data reading devices implementing the principles stated above are now well known. One of these devices is described, for example, in an article by NOBUTAKE IMAMURA and CHUI-CHI OTA entitled, "Experimental Study on Magneto-optical Disc Exerciser with the Laser Diode and Amorphous Magnetic Thin Films", published in the Japanese Journal of Applied Physics, volume 19, No. 12, Dec. 1980, pp. L 731–34.

This optoelectronic device includes a polarized laser beam emitter; a separator element separating an incident beam and a reflected beam; a device for focussing the laser beam on the surface of the magnetic disc containing the data to be read; a light analyzer; and a photoelectric transducer.

The polarized laser beam is directed by the laser beam generator through the separator element and the focussing device onto the surface of the disc in such a way that it is perpendicular to the disc and that it is of the same magnitude as the magnetic domains. After reflection by the surface of the disc, the reflected laser beam is transmitted to the light analyzer by means of the separator element. It is then collected at the output of the analyzer by the photoelectric transducer.

The device for focussing the beam onto the surface of the disc is controlled in such fashion that, independently of any oscillations of the surface of the disc (the surface of a disc is never completely flat and the disc always rotates slightly out of true), the laser beam is always precisely focussed onto the surface of the disc.

In addition, as soon as the track to be read has been selected and the reading device adjusted to face the selected track, the laser beam should remain perfectly centered on the magnetic domain of the track, which contains the data to be read. For this purpose, the laser beam is divided into three viewing beams, with the central beam being used to read the data, while the two lateral viewing beams on either side of the track are used to center the device in relation to the track to be read.

While the reading device briefly described above allows magnetic discs containing a large amount of data to be read (it is recalled that the densities of such discs which are used in magneto-optical memories contain between 100 and 200 times more data per surface area than magnetic discs used in conventional disc memories), it has the disadvantage of being bulky, contains highly accurate—thus costly—focussing and centering devices, and has a reading output signal such that the signal-to-noise ratio at the output of the photoelectric transducer is limited. This is the reason why existing magneto-optical memories are relatively seldom used as compared to conventional magnetic disc memories.

ISUMMARY OF THE INVENTION

The present invention allows these disadvantages to be overcome. By using perpendicular, relatively monochromatic light, there is no longer any need for laser radiation. A beam of light is directed onto the surface of the disc. The beam of light has a diameter $\theta$ that it allows a plurality of tracks (ranging from ten to several tens of tracks) and, on each track, a plurality of magnetic domains to be viewed. It also allows the image of the surface of the disc which is illuminated by the beam having a diameter, $\theta$, to be projected onto a plane on which a plurality of photoelectric transducers are positioned. Thus, in relation to the photoelectronic data reading device of known construction, the highly precise and costly focusing devices are eliminated, the laser beam is no longer used and the signal-to-noise ratio is considerably improved. This is achieved by using a device which uses normal light and extremely simple optics.

According to the invention, the optic photoelectronic device for reading data contained on a magnetic a plurality of tracks includes:

a source for generating a beam of polarized light directed onto the surface of the base in a particular spot on that base, and the interaction between the light and the magnetic state of the base at that spot causes the polarization plane of the light to rotate;

means for detecting the rotation angle of this plane, including a light analyzer and optoelectronic transducers, generating an electrical signal the voltage (or current) of which is a function of the value of the information located at that spot, is characterized in that it includes:

optical means of focussing the wide angle beam of light was to allow a plurality of tracks and a plurality of data on each track to be viewed simultaneously; and means for projecting the image of the surface of the carrier viewed by the lens onto a plane P on which the optoelectronic transducers are positioned.

BRIEF DESCRIPTION OF THE DRAWINGS

Other features and advantages of the invention will become apparent in the description given below by way of non-limitative example and by reference to the accompanying figures, in which:

FIG. 1 consisting of FIG. 1a, 1b, 1c illustrates the principles of the optical reading of data contained on a magnetic medium;

DESCRIPTION OF THE PREFERRED EMBODIMENTS

Figure 1A:
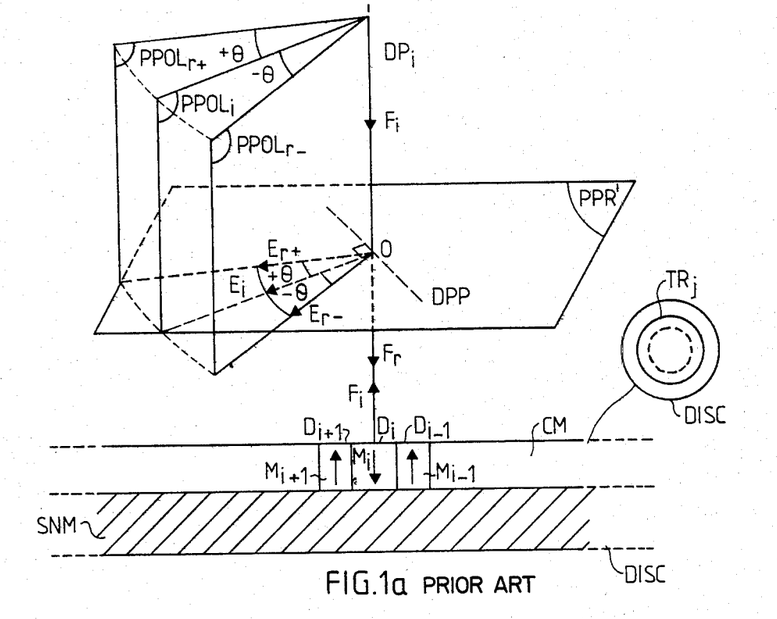
Figure 1B:
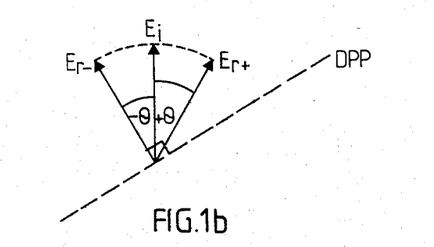
Figure 1C:
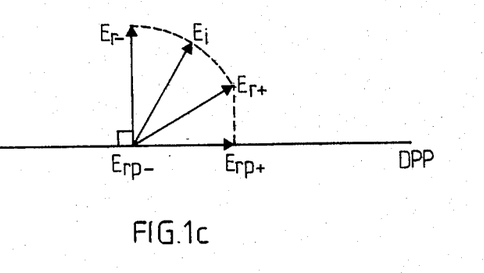

FIG. 1a, 1b and 1c will now be considered. These figures recall the principle underlying the optical reading of magnetic data recorded on a disc, DISC. This disc consists of a base, SNM, on which a magnetic film, CM, has been applied. It includes a plurality of concentric tracks, $TR_j$, each track containing a plurality of bits of information consisting of a group of elementary magnetic domains, $D_i$. Preferably, the data recording mode selected should be such that the magnetization in the elementary domains, $D_i$, is perpendicular to the film surface.

This type of magnetization actually allows higher longitudinal and radial information densities to be achieved, and its mode of viewing by means of a beam of light is easier to implement than the mode of viewing a medium with longitudinal magnetization. It will be assumed in subsequent paragraphs that the intent is to read a magnetic disc having magnetization perpendicular to the surface of the magnetic films, CM. FIG. 1a shows three domains, $D_i$, $D_{i-1}$, $D_{i+1}$, and indicates the respective magnetization vectors of domains, at $M_{i+1}$, $M_i$, $M_{i=1}$.

An incident beam $F_i$ of linear polarized light, preferably coherent, is directed perpendicularly to the surface of film CM, in a direction of propagation $DP_i$. This beam of light is, for example, a laser light beam. Let us consider a plane of propagation, PPR, which is perpendicular to the direction of propagation, $DP_i$. The electric field of the incident beam, $F_i$, of linear polarized light is $E_i$ and its direction is as indicated in FIGS. 1a and 1b, FIG. 1a being a spatial view of plane PPR, while FIG. 1b is a projection of this same plane, PPR, onto a plane which is perpendicular to the direction of propagation.

A plane of polarization is defined for the light constituted by beam $F_i$. This plane is designated by the symbol $PPOL_i$. It is defined by the direction of propagation, $DP_i$, and vector $E_i$.

When the beam of linear polarized light is reflected by magnetic film CM, it becomes reflected beams $F_r$. When beam $F_i$ is reflected by a magnetic domain having negative magnetization such as domain $D_i$ with magnetization $M_i$ in FIG. 1a, the reflected beam $F_r$ of polarized light is such that its electric field $E_{r-}$, has rotated by an angle $(-74)$ in relation to the electric field $E_i$ of the incident beam. The polarization plane of the reflected beam $F_r$ thus becomes PPOLr-, with the diode angle between this plane and plane $PPOL_i$ also being equal to $(-\theta)$.

Similarly, when incident beam $F_i$ strikes a magnetic domain having positive magnetization, such as, for example, domain $D_{i+1}$ (or $D_{i-1}$) having magnetization $M_{i+1}$, the reflected beam $F_r$ is such that its electric field $E_{r+}$ is rotated by $(+\theta)$ in relation to the electric field $E_i$ of the incident beam $F_i$. The plane of polarization $PPOC_{r+}$ thus forms with plane $PPOL_i$ a diode angle equal to $(+o)$.

FIG. 1b provides a better view of the relative positions of electric fields $E_{r-}$, $E_i$, $E_{r+}$ of incident beams $F_i$ and $F_r$, according to whether $F_i$ strikes a domain having negative or positive magnetization.

It can be seen that in order to detect the value of the data recorded on disc DISC, all that is needed is a determination of the direction of magnetization of domains $D_i$, which is the same as determination as to whether the electric-field vector has rotated by an angle $(-\theta)$ or by an angle $(+\theta)$.

To this end, a light analyzer element is placed in the propagation path of reflected beam $F_r$. This analyzer generally consists of a crystal favoring one direction of light propagation. This direction, DPP, is shown as a broken line in FIGS. 1a and 1b, and as a solid line in FIG. 1c. The analyzer element is placed in such a way as to have this favored direction of propagation DPP perpendicular to electric field $E_r$.

The light received at the output of the analyzer has a luminous intensity proportional to the square of the vector which is the projection of the electric field (either $E_{r-}$ or $E_{r+}$) onto the direction of propagation of light favored by the analyzer. Thus, if beam $F_i$ strikes a domain having negative magnetization, the light received at the output of the analyzer will have a luminous intensity proportional to the projection vector $E_{rp-}$ of vector $E_{r-}$ on to the direction of propagation DPP. Similarly, if beam $F_i$ strikes a domain having positive magnetization $(D_{i+1})$, the light received at the output of the analyzer will have a luminous intensity which is proportional to $E_{rp+}$, the projection of vector $E_{r+}$ on to the favored direction of propagation DPP.

If photosensitive elements, which are still being called photoelectric transducers, are placed at the output of the analyzer, electrical signals will be collected at the output of these elements, and these signals will be proportional to $E_{rp-}$, in the case of magnetic domains having negative magnetization, and proportional to $E_{rp+}$, respectively. In the former case, the electric signal collected at the output of the photoelectric transducer has a voltage which is practically equal to zero, while in the other cases this voltage is not equal to zero and large enough to be detected, using, for instance, threshold detecting electronics, following an amplifier stage.

Figure 2:
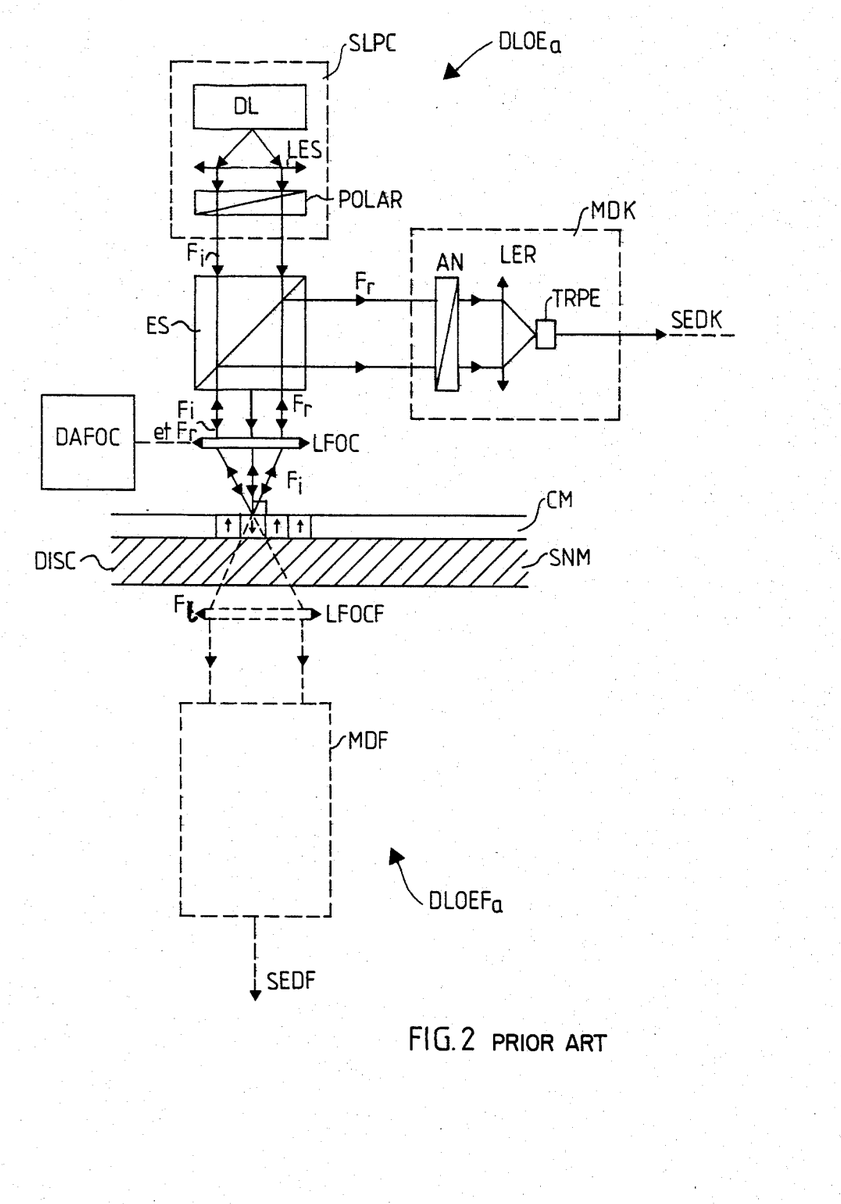
FIG. 2 shows an optoelectronic device for reading data contained on a magnetic carrier of known construction.

Let us consider FIG. 2, which illustrates the principle of a magnetic data photoelectronic reading device, such as the device described in the article referred to above by IMAMURA et al.

This device is designed to read data contained on a magnetic disc, DISC, which has a magnetic film CM, with perpendicular magnetization as indicated in FIG. 2. The data is written on the tracks of the magnetic disc in the manner shown in FIGS. 3 and 4, with the widths of the tracks (i.e., the distance between the axis of symmetry of tracks $TR_i$ and $TR_{i-1}$, for example, or $TR_i$ and $TR_{i+1}$) being on the order of 1 to 2 microns, the size of each magnetic domain contained in each track being on the order of 1 to 2 microns.

Figure 3:
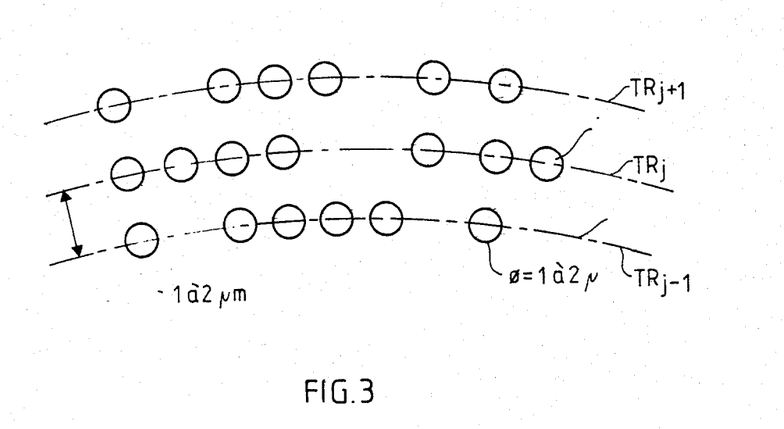
FIGS. 3 and 4 are schematic illustrations showing a group of magnetic domains written on magnetic discs which are intended to be read, using a device such as that illustrated in FIG. 2.
Figure 4:
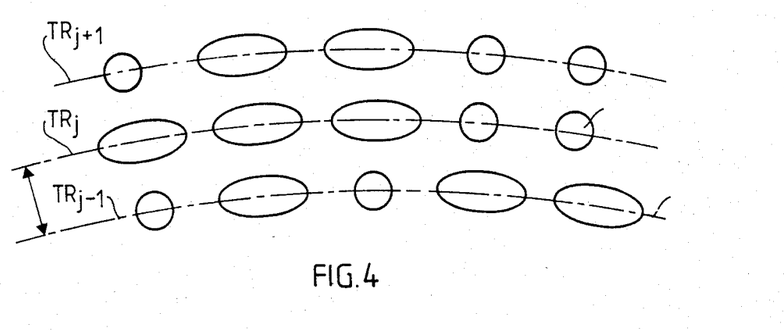

This data is generally written in two different codes which are illustrated in FIGS. 3 and 4, respectively.

FIG. 3 illustrates a plurality of magnetic domains belonging to three tracks $TR_i$, $TR_{i-1}$, $TR_{i+1}$, which are circular, the writing code consisting of variable spacings between the data. FIG. 4 is an illustration of these same tracks, $TR_i$ to $TR_{i+1}$, with the writing code such that the width of the data (i.e., the distance between two adjacent magnetic domains on the same track) being constant, it is constituted by the variable length of the data.

Whether the case illustrated in FIG. 3 is considered or that illustrated in FIG. 4, the data is written either by using a thermomagnetic means or magnetic recording transducers.

The photoelectronic device of known construction is designed as $DLOE_a$. This device includes a source of polarized coherent light, SLPC, which produces a polarized and coherent beam of light, $F_i$, directed onto the surface of the magnetic film, CM, of the disc DISC, in such a way that it is perpendicular to said surface; a separator element, ES, allowing the incident beam to be separated from the reflected beam $F_r$; a focussing lens, LFOC, to focus beam $F_i$ onto film CM in such fashion that the said beam has the same size as the magnetic domains, i.e., 1 to 2 microns; a focussing control device, DAFOC, allowing automatic focussing of beam $F_i$ onto the surface of film CM irrespective of the oscillations on this surface; and means of detecting, by "Kerr effect," the bits of data recorded on each track of film CM of disc DISC.

Source SLPC generates a beam $F_i$ of coherent polarized light, which could, for instance, be a laser beam. This beam passes successively through the separator element, ES and the focussing lens LFOC before striking the surface of film, CM, at an angle which is perpendicular to said surface. As shown in FIG. 2, the focussing lens is controlled by the focussing control device, DAFOC, in such a way that, regardless of the variations in the distance between the focussing lens of incident beam $F_i$ and film CM, the beam is always perfectly focussed onto the surface of film CM.

The incident beam, $F_i$, is reflected on the surface of film CM, and becomes reflected beam $F_r$, which passes successively through focussing lens LFOC and separator element ES before passing through the "Kerr effect" detection means, MDK. A signal, SEDK, is collected at the output of the detection means, MDK, producing zero voltage signal when the incident beam $F_i$ strikes a domain, $D_i$, having negative magnetization, and producing a non-zero voltage when this same beam strikes a domain having positive magnetization.

As may be seen in FIG. 2, source SLPC includes a laser diode, DL, a lens, LES, and a polarizer, POLAR. The laser radiation emitted by the laser diode is transformed into a beam of parallel rays at lens LES before passing through polarizer POLAR. At the output of the polarizer, the resulting beam, $F_i$, is a linearly polarized beam of light.

The means of detection, MDK, include an analyzer, AN, a lens, LER, and one or more photoelectric transducers, TRPE. Only a single transducer is shown to representatively illustrate the photoelectric transducer arrangement.

The analyzer receives the beam of reflected coherent polarized light, $F_r$, and operates in the manner indicated in FIGS. 1b and 1c.

At the output of the analyzer, the beam is directed to lens LER which focusses it on to photoelectric transducer TRPE.

Another variation of device $DLOE_a$ is illustrated by the dotted lines in FIG. 2. It is designated as $DLOEF_a$.

Instead of using reflected beam $F_i$, its principle of operation relies on use of beam, $f_t$, called a transmission beam, which passes through the film, CM, and through the non-magnetic medium SNM, of disc DISC, while its polarization plane is being rotated in a rotation similar to that of beam $F_i$ when it strikes film CM. This phenomenon is called the FARADAY effect. It is strictly the DLOEF a device includes a focussing lens LFOCF followed by the Faraday effect means of detection, MDF.

The operation of lens LFOCF and of means of detection MDF is similar to that of lens LFOC and means of detection MDK described above. It should be clear that if the Faraday effect is not used, device $DLOEF_a$ does not include the separator element, ES, as was the case for device $DLOE_a$. Preferably, lens LFOCF may be controlled by a focussing control device.

Devices $DLOE_a$ and $DLOEF_a$ have the following disadvantages: Since incident beam $F_i$ is centered on film CM in such a way as to make its size of the same magnitude as the size of the magnetic domains, i.e., 1 to 2 microns; on the one hand, the devices of known construction need to be positioned facing a specific track with a high degree of accuracy; and, on the other hand, the focussing device, DAFOC, must also be extremely accurate. It can also be shown that the signal-to-noise ratio, i.e., the ratio between signal SEDK (SEDF) and the noise collected at the output of transducer TRPE is relatively low. In addition, the devices of known construction are extremely bulky and costly.

Figure 5:
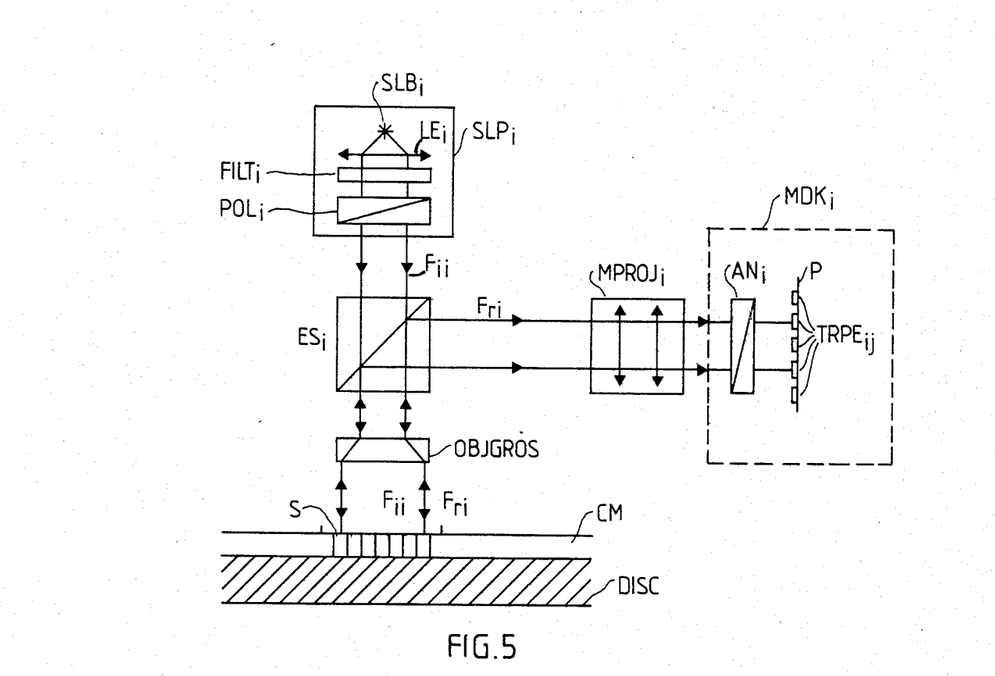
FIG. 5 is a diagram of principle of the photoelectric device for reading data contained on a magnetic medium according to the invention.

The optoelectronic reading means according to the invention, the principle of operation of which is shown in FIG. 5, allows the above-mentioned disadvantages to be overcome.

Referring to FIG. 5, it is assumed that the purpose of the reading means is to read the magnetic data contained on a disc DISC which has a magnetic film, CM, the information being recorded within a plurality of circular concentric tracks, in the manner shown in FIGS. 3 and 4.

The optoelectronic device according to the invention operates according to the reading principles which were presented above in connection with the description of FIG. 1, that is, to use a beam of incident polarized light which is perpendicular to the surface of the disc, and to detect the rotation of the polarization plane of the light of the reflected beam.

The various essential constituent elements of the optoelectronic reading device according to the invention comprise a source of polarized light SLP, a separator element, $ES_i$, separating the incident beam from the reflected beam, magnification optics, OBGROS, allowing the magnetic film, CM, on disc, DISC, to be illuminated on a surface having a diameter $\phi$, such that several tracks (at least ten) may be viewed simultaneously along with a plurality of magnetic domains within each track, means of projection, $MPROJ_i$, a light analyzer $AN_i$, a projection plane, P, onto which the image of the surface of the device, illuminated by the incident beam, is projected, said image being obtained by the means of projection, $MPROJ_i$, with the analyzer, $AN_i$, being placed between the means of projection and plane P and a set of photoelectric transducers, $TRPE_{ij}$, generating a group of electrical signals corresponding to the various magnetic domains of disc DISC viewed within the surface, illuminated by the beam of incident light.

The source of polarized light, $SLP_i$, generates an incident parallel beam of light $F_{ii}$. This light is relatively monochromatic. It may or may not be coherent.

The incident beam $F_{ii}$ passes through the separator element $ES_i$ and is sent through the magnification optics, OBGROS, perpendicularly to the surface of the magnetic film, CM, of disc DISC. The surface thus illuminated is designated as S and is substantially circular. If the magnification, G, of optics OBJGROS ranges from 10 to 500 times (or even 0), for example, it is possible to view a surface having a diameter $\phi$ ranging from 10 microns to about 500 microns. Thus several tens of tracks, or even hundreds of tracks, and several tens of magnetic domains, or even several hundreds of magnetic domains within each track may be viewed.

It is thus apparent that contrary to the optoelectronic reading devices of known construction the light beam is no longer focussed onto a single magnetic domain, which had the disadvantage of requiring a light beam with a very small diameter.

The reflected beam $F_{ri}$ successively passes through the optics, OBJGROS, and the separator element, $ES_i$, before passing through the means of projection, $MPROJ_i$. The light from the reflected beam, $F_{ri}$, then passes through the polarized light analyzer, $AN_i$, before being projected to plane P on which the photoelectric transducers, $TRPE_{ij}$, are positioned.

An image of surface S is thus obtained on plane P. This image is seen through the optics, OBJGROS, the separator element, $ES_i$, and the means of projection, $MPROJ_i$. Let us assume this image of surface S to be IS. This image is therefore a true image of the field of the data read inside surface S viewed by the optics, OBJGROS. This image seen through the optics group made up of optics, OBJGROS and the means of projection, $MPROJ_i$, may be obtained with a magnification g ranging, for example, from 100 to 1000 times. Thus, if it is assumed that the data has a diameter of 1 micron, and that the magnification g is on the order of 500, then spots will be viewed on P which correspond to this data, and the size of these spots will be 500 microns. These spots will appear as light spots if they correspond to magnetic domains having positive magnetization, and as black spots if they correspond to magnetic domains having negative magnetization.

The size of these spots is thus perfectly compatible with the size of commercial photoelectric transducers. It is therefore possible to mount on plane P, in an OY direction corresponding to a radius of the disc, a plurality of photoelectric transducers (which are still called photosensitive cells and which, generally, are semiconductor photodiodes), the width, PI, of which is equal to the width of track image $ITR_j$ seen inside surface IS (see FIG. 6). Several tracks may thus be read simultaneously. In addition, if a bar of photodiodes is positioned on plane P along axis OX, which is perpendicular to axis OY, that is, in a direction corresponding to the tangent to the tracks on the disc, the same information may be reread several times. It may thus be seen that a matrix of photodiodes may be mounted on plane P, said matrix having a width along axis OY which is equal to width PI, and a width along axis OX corresponding to the distance between the images $ID_i$ of the magnetic domains on each of the tracks. This width is equal to the distance, for example, between the two images, $ID_i$ and $ID_{i+1}$ shown in FIG. 6. It is thus seen that the same information may be read several times. Because of this, if an electronic logic circuit is connected to the output of the matrix of the group of transducers $TRPE_{ij}$, this circuit using the data redundancy, that is, the fact that a bit of information is reread several times, the signal-to-noise ratio will be significantly reduced in relation to the signal-to-noise ratio which would have been obtained with only one transducer. Indeed, if, at the output of a single transducer, a signal of S amplitude is received, and a noise level B, and if the same information is read n times, and if all the corresponding signals are added together, a signal S is obtained at the output of the adder, and the remaining noise is thus equal to B. The signal-to-noise ratio thus becomes n S/B, whereas it used to be equal to S/B.

The various constituent elements of the source of polarized light, $SLP_i$, are, for example, a source of white light, $SLP_i$, a lens, $LE_i$, which forms a beam of parallel light which passes through $FILT_i$ before going through a polarizer $POL_i$.

The means of projection, $MPROJ_i$, consists, for example, of a group of lenses.

Since a number of tracks viewed by the optoelectronic device according to the invention is on the order ranging from several tens to about a hundred tracks on the one hand, and that, on the other hand, the total number of tracks on a magnetic disc is on the order of several thousand, it is clear that the optoelectronic reading device must be moved in parallel with the diameter of the disc and thus moved in such a way as to be capable of viewing all the tracks. This reading device must therefore be at least partially placed on a moving device enabling it to view all the tracks on the disc.

Figure 7:
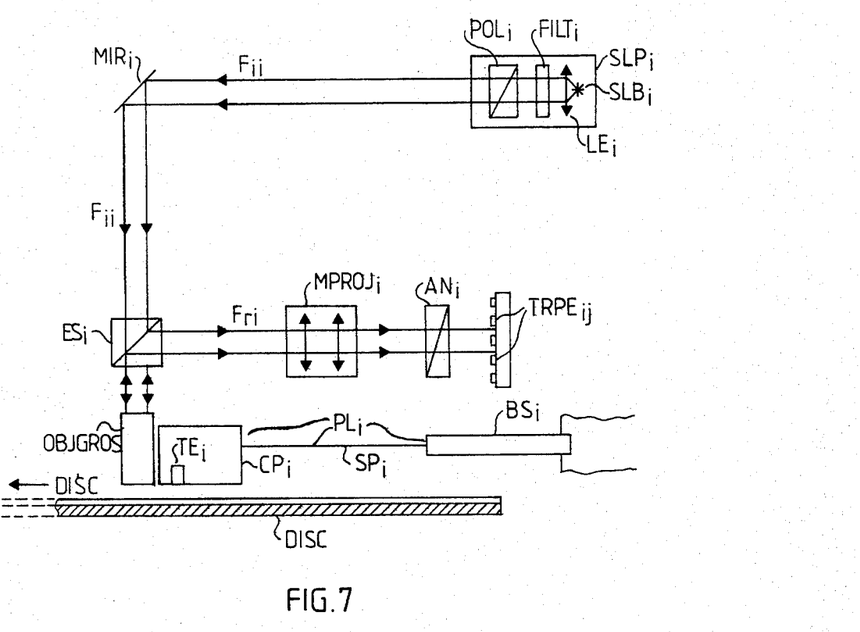
FIG. 7 is an example of the preferred embodiment of the photoelectronic device for reading the data contained on a magnetic medium according to the invention, said device being positioned on a platform carrying a main body containing a transducer for recording the data contained on the magnetic medium.

FIG. 7 shows an optoelectronic reading device according to the invention, part of such device being positioned on a platform allowing said device to read all the tracks on the disc. This platform may be of a conventional type, similar to those manufactured, for example, by "Applied Magnetic Corporation" (A.M.C.) and marketed under the names Winchester 3304 and 3306. Such a platform includes, for example, a support strut $BS_i$ one end of which is fastened, for example, to a movable carriage which is external to disc DISC (the carriage is not shown in FIG. 7 for purposes of simplification), the other end being integral with a suspension spring $SP_i$ which carries a main body, $CP_i$. This main body contains, for example, an electromagnetic transducer for writing the data contained on the magnetic disc and may be of the type illustrated and described in U.S. Pat. No. 4,261,024. This transducer is designated as $TE_i$.

Platform $PL_i$ is of a movable type, i.e., it is moved radially over the face of disc DISC with which it is associated to allow the writing transducer (and also the optoelectronic device according to the invention) to have access to any data contained on the face of the disc.

Main body $CP_i$ is generally in the shape of a relatively flat rectangular parallelepiped with a first "large face" positioned over the face of the disc and containing the core of the writing transducer $TE_i$, the second "large face" containing the ends of the input and/or output conductors of said transducer.

When the magnetic disc DISC is rotated, there forms between it and the first large face of main body $CP_i$ a cushion of compressed air, which prevents the body from touching and, therefore, from damaging it. The main body is then said to float over the disc. Under these conditions, the distance between the core of transducer $TE_i$ and the face of the disc is on the order of a few tenths of a micron.

Figure 6:
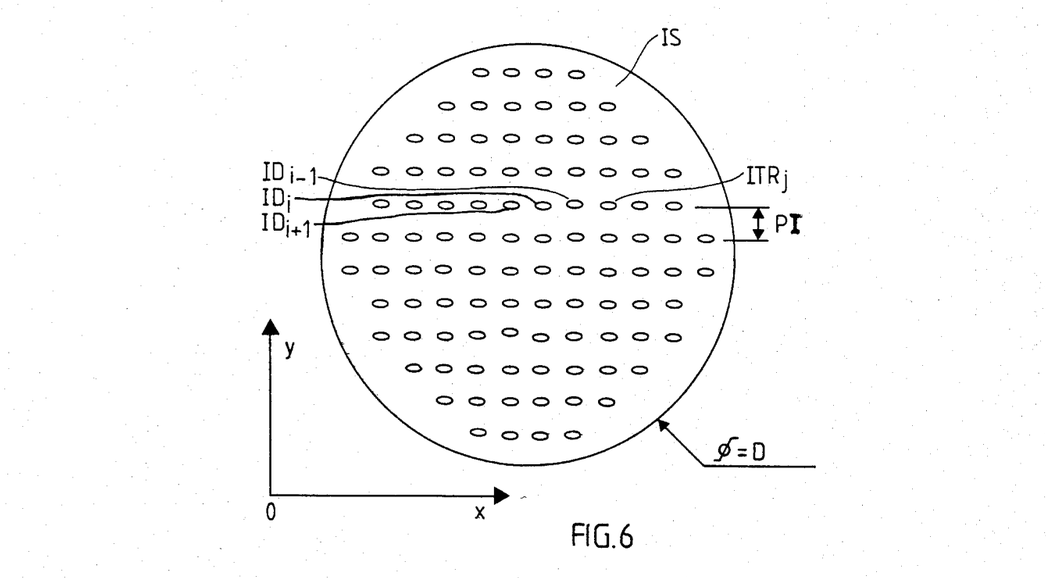
FIG. 6 shows the image of the surface of the magnetic carrier viewed by the magnifying lens of the photoelectronic device according to the invention, said image being such that it is projected onto a plane P on which are mounted the photoelectric transducers for reading the data contained on the carrier.

The various elements constituting the optoelectronic reading device illustrated in FIG. 7 are identical to those which are represented in FIG. 6, i.e., the optics, OBJGROS, the separator element, $ES_i$, the means of projection, $MPROJ_i$, the analyzer, $AN_i$, the plane, P, the group of photoelectric transducers, $TRPE_{ij}$, the source of polarized light, $SMP_i$.

All the elements of this device according to the invention should preferably be mounted on platform $PL_i$, except for the source of polarized light $SLP_i$.

Under these conditions, the source, $SLP_i$, is placed outside the disc and is fixed. It then becomes necessary to place on the platform, $PL_i$, a mirror, $MIR_i$, which receives beam $F_{ii}$ sent by the source $SLP_i$, to redirect it to the optics, OBJGROS, by means of the separator element $ES_i$.

It is clear that all these elements must be positioned with utmost position on the platform.

Figure 8:
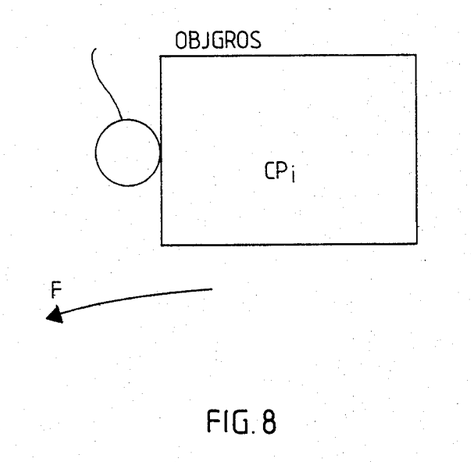
FIG. 8 shows the arrangement of the magnifying lens of the photoelectronic reading device in relation to the main body containing the transducer used for writing the data contained on a magnetic medium.

FIG. 8 is a top view of the main body, $CP_i$, and of the optics, OBJGROS, showing in greater detail the relative positions of these two elements. This same figure contains an illustration showing the direction of rotation of the disc which moves along the direction indicated by arrow F. It can thus be seen that the main body, $CP_i$ (and, thus, the writing transducer, $TE_i$), sees the data in each track of the disc pass in real time before the optics, OBJGROS.

Figure 9:
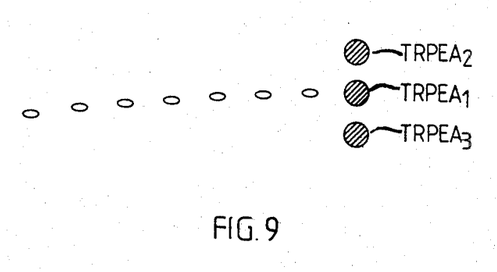
FIG. 9 shows a group of 3 photoelectronic data transducers contained on a magnetic medium, the signals of which are designed to be used by a device for controlling the position of a photoelectronic reading device, allowing said device to remain perfectly centered facing a specific track on the magnetic carrier.

As can be seen in FIG. 9, the optoelectronic device according to the invention may preferably include a group of three diodes, $TRPEA_1$, $TRPEA_2$, $TRPEA_3$, the output signals of which are sent to a device allowing the position of writing transducer $TE_i$ to be controlled along with the entire photoelectronic reading device in such a way as to maintain either the former or the latter in a position which is perfectly determined facing either a track, $TR_j$, in the case of the former, or a group of tracks, including track $TR_j$ as the central track, in the case of the latter. The distance between the two photodiodes, $TRPEA_1$ and $TRPEA_2$ on the one hand, and between $TRPEA_1$ and $TRPEA_3$ on the other, is equal to PI/2, i.e., one-half of the distance separating the images of two adjacent tracks (cf. FIG. 6).

It can thus be said that the optoelectronic reading device (or recording transducer only) is correctly positioned facing disc DISC when the average signal generated by transducer $TRPEA_1$ is at a maximum level, with the two transducers (photodiodes), $TRPEA_2$ and $TRPEA_3$, generating a signal which is as close as possible to zero. The signal selected for this purpose is the average signal, because when transducer $TRPEA_1$ sees all the magnetic domains of track $TR_j$ move past it, the signal generated by the transducer is equal to zero in the case of a magnetic domain with negative magnetization, and not equal to zero in the case of a magnetic domain with positive magnetization.

Figure 10:
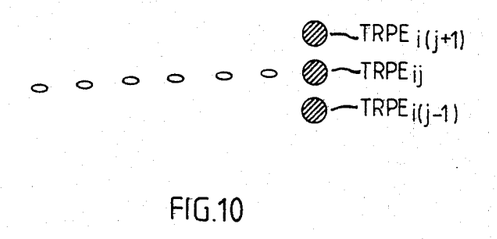
FIG. 10 shows a group of three photoelectronic transducers for reading data contained on magnetic carriers, as they are positioned on plane P.

It can be shown that the operation of the device used to control the position of the device according to the invention may be improved even more by using the data produced, for example, by three adjacent photoelectric transducers, such as transducers $TRPE_{ij}$, $TRPE_{i(j+1)}$, $TRPE_{i(j-1)}$, illustrated in FIG. 10, and these transducers are positioned in a direction which is parallel to axis OY (cf. FIG. 6), i.e., substantially perpendicular to the direction of travel of the tracks.

It can thus be seen that the photodiode matrix, $TRPE_{ij}$, as well as the three position control photodiodes, $TRPEA_1$ to $TRPEA_3$, may be placed on plane P.

It is shown that mounting the various elements making up the optoelectronic device according to the invention must be done with the highest possible degree of precision, said precision being on the order of one micron.

Figure 11A:
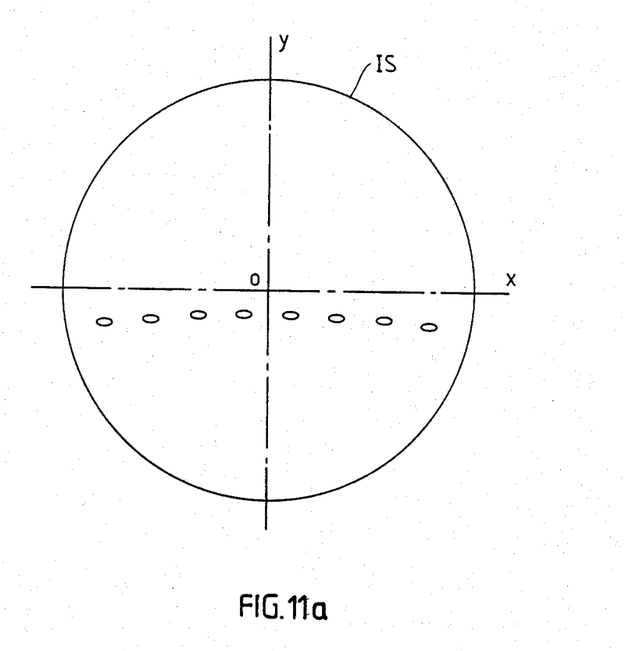
FIGS. 11 and 12 illustrate the process used for mounting on plane P the photoelectronic transducers of the device according to the invention.

Mounting the lens, OBJGROS, in relation to the main body, $CP_i$, and positioning the various photodiodes on plane P in relation to the lens and to the main body, is done in accordance with the following principles:

The size of the main body is quite large in relation to the size of the data. The size of the main body will thus be on the order of 2 millimeters in height, 3 millimeters in width, and 4 millimeters in length. Because of this, depending on the degree of precision with which the lens has been mounted in relation to the main body and, as a result, in relation to the writing transducer, the written data in a specific track may occupy varying positions in relation to OY in the field of view of the lens and, as a result, within the image, IS, of surface S (see FIG. 11a which contains an illustration of the data written by the recording head and which is offset in relation to axis OX).

In order to position the three control transducers, $TRPEA_1$ to $TRPEA_3$, in plane P, the following procedure is used: Assume that the surface of film CM of disc DISC is unrecorded. As soon as lens OBJGROS is focussed on the main body, the data on one track is written by means of writing transducer $TE_i$. Thus the image of this track will appear on plane P (cf. FIG. 11a). As can be seen in that same figure, it is necessary for the written track to appear in the field of view of the lens, i.e., within image IS, but it is not necessary for that track to be perfectly centered in relation to said lens, because a silicon substrate is adjusted as a function of the image of said track, said substrate including the 3 control photodiodes, $TRPEA_1$ to $TRPEA_3$, as well as the data reading photodiode matrix, $TRPE_{ij}$.

Figure 11B:
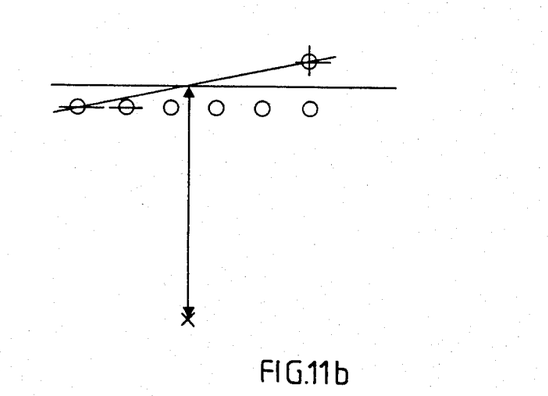
Figure 12:
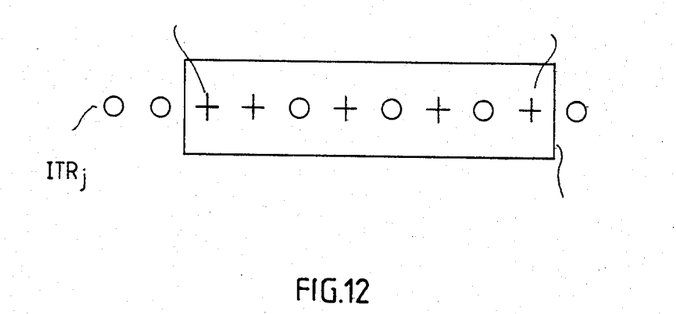

It is clear that the $TRPEA_1$ element will be placed on the silicon substrate in such a way as to be in alignment with the track which has just been recorded, the two other elements surrounding it, i.e., $TRPEA_2$ and $TRPEA_3$, being positioned at a distance equal to PI/2 (see above). Adjusting the three control photodiode elements in relation to writing transducer $TE_i$ is relatively easy, since the magnification provided by the optics and the means of projection give an image of the track and of the data recorded on said track, such that the track has a width of one-half millimeter (with the image of the magnetic domains also being of a width of said order of magnitude). Thus, FIG. 11b shows that the data contained on the recorded track, the image of which is $ITR_j$ is not in alignment with photodiode $TRPEA_1$. Said alignment is very simple to achieve by offsetting the group of control photodiodes.

As soon as that adjustment has been completed, it is still necessary to adjust the group of reading photodiodes. This adjustment simply requires that a certain member of bars of diodes (which are commercially available in bar form) be available. If it is assumed that the photodiodes on a bar are aligned in relation to the same silicon substrate, then all that is needed is to align the first and last diodes in relation to the image of the written track, $TR_j$. It is evident that the operation may be repeated for several bars of diodes so as to form a photodiode matrix.

It will be understood that all the photodiode bars (including the control diodes and the reading diodes) may be mounted, preferably, on the same silicon substrate.

It is thus seen that the silicon substrate is the materialization of plane P.

I claim:

1. An optoelectronic reading device for reading data contained on a magnetic surface SM within a plurality of tracks $TR_j$, of a carrier adapted to be driven past the reading device comprising:

a source ($SLP_i$) emitting a beam of polarized light $F_{il}$ onto the magnetic surface of the carrier at a particular area on said surface where direction of the magnetic state of the carrier at said surface area produces a rotation of the plane of polarization of the light;

means positioned to receive light reflected from the surface SM for detecting the angle of rotation of said plane comprising an analyzer ($AN_i$) of light and photoelectric transducer means ($TRPE_{ij}$) for delivering an electric signal in response to the reflected beam of light whose voltage or current is a function of the values of the data stored at said point;

optical means OBJGEROS for focussing the beam of light $F_{ii}$ on a large field of observation on said surface area, enabling simultaneous observation of a plurality of tracks and a plurality of data on each track; and projection means ($MPROJ_i$) for projecting the image of the carrier surface being viewed by said optical means through said analyzer and on to a plane P where said photoelectronic transducers are positioned.

2. The reading device as set forth in claim 1, wherein the optical means (OBJGROS) for focussing on a large field of observation has a magnification range between 10 to 1000 times.

3. The device as set forth in claim 1 or 2, wherein the magnetic medium is a disc having a plurality of circular tracks, the photoelectronic transducers positioned plane P constitute a matrix comprising a plurality of lines and columns, said columns being set up along an OX axis corresponding to a radius of the disc, the transducer lines being parallel to an OX axis perpendicular to OY, the width between transducers ($TRPE_{ij}$) aligned in a direction parallel to OY being equal to the width of the image of thre tracks, whereas the width between the transducers aligned according to lines parallel to OX is equal to the width of the images of the magnetic domains.

4. The device according to claim 3 wherein the means for detecting (MDK) the angle rotation, the optical means ($OBJGROS$) for focussing on a large field of observation, and the means ($MPROJ_i$) of the image, the plane P and its optoelectronic transducers ($TRPE_{ij}$) are arranged on a platform ($PL_i$) movable relative to the tracks of the carrier, said platform including a support strut ($BS_i$) as an integral part of a suspension spring ($SP_i$), which carries a main body ($CP_i$) containing a recording and a carrier-data transducer, the main body enabling in real time, a succession of data from each track of the disc to be viewed as the disc moves past the optical means (OBJGROS) for focussing on a large field of observation.

5. The device according to claim 1 wherein the means for detecting (MDK) the angle rotation, the optical means (OBJGROS) for focussing on a large field of observation, and the means ($MPROJ_i$) of the image, the plane P and its optoelectronic transducers ($TRPE_{ij}$) are arranged on a platform ($PL_i$) movable relative to the tracks of the carrier, said platform including a support strut ($BS_i$) as an integral part of a suspension spring ($SP_i$), which carries a main body ($CP_i$) containing a recording and a carrier-data transducer, the main body enabling in real time, a succession of data from each track of the disc to be viewed as the disc moves past the optical means (OBJGROS) for focussing on a large field of observation.

6. The device according to claim 1 comprising three photosensitive transducers ($TRPEA_{1,2,3}$) aligned along a common axis (OX) in a direction substantially perpendicular to the direction of travel of the tracks, the distance between two adjacent transducers being equal to one-half of the width separating the images of two adjacent tracks, the outputs of said transducers being sent to a device enabling the position of the optoelectronic reading device for the carrier data to be controlled relative to a set of tracks ($TR_j$) thereby determined.

7. The device according to claim 6 wherein the means for detecting (MDK) the angle rotation, the optical means (OBJGROS) for focussing on a large field of observation, and the means ($MPROJ_i$) of the image, the plane P and its optoelectronic transducers ($TRPE_{ij}$) are arranged on a platform ($PL_i$) movable relative to the tracks of the carrier, said platform including a support strut ($BS_i$) as an integral part of a suspension spring ($SP_i$), which carries a main body ($CP_i$) containing a recording and a carrier-data transducer, the main body enabling in real time, a succession of data from each track of the disc to be viewed as the disc moves past the optical means (OBJGROS) for focussing on a large field of observation.

* * * * *

UNITED STATES PATENT AND TRADEMARK OFFICE
CERTIFICATE OF CORRECTION

PATENT NO. : 4,510,544

DATED : April 9, 1985

INVENTOR(S) : Jean-Pierre LAZZARI

It is certified that error appears in the above-identified patent and that said Letters Patent is hereby corrected as shown below:

Claim 1, column 13, line 63, change "$F_{il}$" to --$F_{ii}$--;

Claim 1, column 14, line 16, "on.to" should be --onto--;

Claim 3, column 14, line 31, "thre" should be --the--.

Signed and Sealed this

Tenth Day of September 1985

[SEAL]

Attest:

DONALD J. QUIGG

Attesting Officer    Acting Commissioner of Patents and Trademarks - Designate